United States Patent Office 3,156,520
Patented Nov. 10, 1964

3,156,520
DYESTUFFS AND ALKALI METAL SALTS OF WOOD SUGAR ACIDS AND LIGNIN SULFONATES
Leroy A. Blaisdell, Eatontown, N.J., assignor to American Can Company, New York, N.Y., a corporation of New Jersey
No Drawing. Filed Apr. 1, 1963, Ser. No. 269,754
2 Claims. (Cl. 8—91)

This invention relates to the production of stable dispersed dye pastes and particularly to a method for imparting superior storage and redispersion properties to such dye pastes by the incorporation therein of a product obtained from the spent liquor resulting from the sulfite pulping of wood.

Dyestuff pastes are widely used in the application of coloring matter to fibrous materials by a variety of methods, including vat dyeing, printing, machine dyeing and pigment pad reduction dyeing. In each of these processes, the stability of the dyestuff paste against settling, recoagulation and excessive thickening, as well as the property of ready redispersion, are of great importance.

It has now been found that dyestuff pastes having superior storage and redispersion properties are obtained by the incorporation in the paste of a minor percentage of a modifying agent derived from the spent liquors resulting from the sulfite process for obtaining cellulose pulp from wood or similar plant materials. The modifying agent which effects such improvement in the properties of dyestuff pastes contains an alkali metal salt of a complex mixture of wood sugar acids together with a minor percentage of an alkali metal salt of a portion of the lignosulfonic acids originally present in the spent sulfite liquor.

The spent liquors obtained from the sulfite wood pulping process contain substantial amounts of lignosulfonates, wood sugars and incompletely hydrolyzed carbohydrates. Treatment of such liquors with an excess of lime in a multi-stage manner according to the Howard process disclosed in the United States Reissued Patent 18,268, December 1, 1931, and in United States Patents No. 1,856,558, May 3, 1932, and 1,924,361, August 29, 1933, results in a precipitation of most of the lignosulfonate as basic calcium lignosulfonate, which may be removed from the liquor. At the same time, the treatment with lime results in the conversion of a large part of the carbohydrate components of the liquor to calcium salts of various wood sugar acids. These wood sugar acid salts, together with that minor portion of the lignosulfonates not precipitated by the multi-stage lime treatment, are present in the effluent liquor or tail liquor containing the carbohydrate components as described in the Howard patents. It is from this portion of the spent sulfite liquor that the valuable modifying agent for improving the stabilization and dispersion properties of dyestuff pastes referred to in this invention is recovered.

The recovery of the dyestuff paste modifier from the effluent or tail liquor from the Howard process is effected by treating the tail liquor with carbon dioxide to precipitate free lime as calcium carbonate, followed by the addition of sufficient alkali metal carbonate such as sodium or potassium carbonate to convert the calcium salts of the organic compounds present to the corresponding alkali metal salts. For economic reasons, the sodium salts are preferred over the other, more expensive, alkali metal salts. After filtering to remove precipitated calcium carbonate, the filtrate is concentrated and spray dried to yield the desired modifying agent as a powdered blend of the alkali metal salts of various wood sugar acids and those lignosulfonic acids which are not precipitable by lime. The blend is substantially free of lime-precipitable lignosulfonates and inorganic calcium salts. If desired, the drying step may be omitted and the modifying agent utilized in the form of a concentrated aqueous solution, suitably at a concentration of 50–55% solids.

The modifying agent prepared in the above manner from spent sulfite liquor is of unique value as an additive to dyestuff pastes, since it contributes to the pastes an unusual and unexpected combination of properties not otherwise readily attainable. The modifying agent apparently acts both as a dispersant and as a humectant, and in addition possesses chelating properties of particular value in the application of dyes to fibers in the presence of hard water or water containing metallic ions. Dyestuff pastes incorporating this modifying agent either alone or in combination with known dispersants exhibit greatly improved stability against settling, recoagulation and excessive thickening. When the pastes are dried, the dry dyestuff very readily redisperses in water to give a speck-free dispersion which is highly desirable for coloring fibrous materials by the conventional methods. In contrast, pastes which do not contain the modifying agent of this invention often dry to a hard, brittle cake having poor redispersibility.

The redispersibility of dye pastes may be measured by drying a small amount of the paste overnight at room temperature, slurrying the dried cake in water and filtering the slurry through a filter paper. Pastes containing the modifying agent prepared as described above from spent sulfite liquor leave only a few specks of dye, visible to the naked eye, on the filter paper, whereas the omission of the modifying agent from the paste results in a marked increase in the specking visible on the filter paper.

The modified dye pastes exhibit substantial improvements in the dyeing of fibrous materials by either conventional machine dyeing or padding methods in comparison with comparable dye pastes which do not contain the modifying agent. The modified pastes are distinguished by their production of uniform machine dyeings and smooth, speck-free pigment pads.

*Example 1*

100 parts of jade green filter cake containing 20% solids, as described in Example 1 of U.S. Patent No. 2,185,871, were blended with 42 parts of a 50% aqueous solution of a modifying agent comprising the sodium salts of wood sugar acids and lignosulfonates not precipitable with lime, as obtained from spent sulfite liquor in the manner previously described. To the modified paste was added 0.4 part of the sodium salt of sulfonated naphthalene formaldehyde condensate and 25 parts of water. After thorough milling in a colloid mill the diluted dye paste was centrifuged and sieved to yield a highly redispersible dye paste of improved stability against recoagulation, settling and excess thickening. The paste is suitable for vat dyeing, pigment padding and package dyeing applications.

In the pigment padding process, the above dyestuff paste is suspended in water with the addition of dispersants or of thickeners such as carboxymethyl cellulose, which assists in anchoring the dye particles to the cellulosic fabric. The fabric is passed through the dye suspension and the excess suspension removed by a squeeze roll. If desired, the fabric may be dried at this point, but this is optional. The dye-bearing fabric is then passed through an alkaline sodium hydrosulfite bath to reduce and fix the dye on the fabric, and the dyed fabric subsequently oxidized, washed and dried.

In package dyeing in a dye circulating machine, the dye paste is suspended in water with the addition of such dispersants or assistants as are required or desirable and the dye suspension is pumped by a circulating pump through a package of cellulosic fiber or is circulated through suspended yarn. The pigmented fiber is then reduced in a bath of caustic soda and sodium hydrosulfite and subsequently subjected to oxidation, washing and drying, after which it is ready for further processing.

In the vat dyeing process, the dyestuff is dispersed in the bath, reduced to its leuco form, the fiber steeped in the bath and subsequently subjected to oxidation, washing and drying.

The modifying additive of this invention is also of value in the dyeing of synthetic fibers such as polyester fibers, the incorporation of the modifier as a humectant in the dispersed dyestuff resulting in improved evenness or uniformity of color retention on the fibers when compared to the results obtained in comparable dyeings made without the incorporation of the modifier.

Example 2

102 parts of Solvent Dye C.I. 62025 were blended with 10 parts of a partially desulfonated sodium lignosulfonate dispersant, the mixture diluted with 400 to 500 parts of water and the particle size reduced to 1 to 2 microns diameter by colloid milling. The milled suspension was then treated with 41 parts of partially desulfonated lignosulfonate and 62 parts of the 50% aqueous solution of the modifier derived from spent sulfite liquor as described in Example 1. After dilution of the resulting disperse dyestuff with water to a total of 778 parts of color paste, was screened and was then ready for use in dyeing Dacron polyester fabric in wine shades by the Thermosol technique or other conventional method for dyeing this type of fiber.

In the Thermosol process the fabric of polyester is padded with the disperse dye suspension, squeezed free of excess of the dyeing fluid and dried. The dried fabric is then heated to 400–410° F. for 60 to 90 seconds to set the dye, washed and dried. It is then ready for use. To afford satisfactory dyeings, the dye dispersion must be a non-foaming, microscopically dispersed mixture free of specks large enough to cause spots on the dyed fabric. These requirements are fully met by the dye dispersion of Example 2, the uniformity of the dyed fabric being superior to that of a control prepared as in Example 2 with the single omission of the modifying additive derived from spent sulfite liquor.

The dyestuff modifying additive of this invention is also of substantial benefit as a humectant and dispersant to produce improved uniformity of color when incorporated in a mixture of disperse dyes and vat colors which are used for dyeing mixed fiber blends of cotton and synthetic polyester fibers by conventional procedures.

Example 3

50 parts of Disperse Yellow 42, C.I. 10338 and 10 parts of partially desulfonated sodium lignosulfonate were diluted with 80 to 110 parts of water and milled in a colloid mill to reduce the particle size to 1 to 2 microns diameter. After addition of 15 parts of partially desulfonated sodium lignosulfonate, sufficient water was added to bring the total to 200 parts of paste. The paste was then blended with 242 parts of a 11% solids paste of Vat Yellow 2, C.I. 67300 and 92 parts of a 50% solids solution of the modifying agent derived from spent sulfite liquor as described in Example 1. In this and all previous examples, the amounts of all components are measured in parts by weight. The resulting mixture of dyestuffs was found suitable for dyeing fiber blends of cotton and polyester by conventional dyeing methods used for applying vat colors and disperse dyes to these mixed fibers. The uniformity of such dyeings is improved over controls prepared in similar manner with the single omission from the dyeing composition of the modifying agent of this invention.

The reasons for the effectiveness of the modifying agent of this invention in improving the stability, the redispersion properties and the dyeing properties of dye pastes are not fully understood. It is believed, however, that the unique combination of dispersing, humectantcy and chelating properties exhibited by the modifying agent is responsible for the advantageous results obtained when this material is incorporated in dye pastes. The amount of the modifier which is required varies with the specific dyestuff and also upon the particular dyeing process to which the dye paste is to be adapted. In general, however, the modifier is effective in amounts above about 10% of the dry weight of the dyestuff, particularly when utilized in conjunction with another dispersing agent such as a partially desulfonated lignosulfonate salt. In some cases, the modifier may be added in amounts equal to or exceeding the dry dyestuff weight, as illustrated in Example 1 above, although it is generally unnecessary and therefore economically undesirable that the ratio of modifier to dry dyestuff exceed about 1.5 to 1. The modifier is, of course, completely water-soluble and is therefore readily freed from the fiber during conventional washing steps subsequent to the dyeing process.

It is to be understood that the examples hereinbefore set forth are intended to be illustrative rather than restrictive, the scope of the invention being limited only by the appended claims.

I claim:
1. A dyestuff paste of improved stability and redispersibility comprising a water-dispersed solid dyestuff and a modifying additive obtained by adding an excess of lime to spent sulfite liquor, filtering to remove solids comprising calcium lignosulfonate, treating the filtrate with carbon dioxide to precipitate free lime as calcium carbonate, adding sufficient sodium carbonate to convert the calcium salts of the wood sugar acids and lignosulfonic acids to sodium salts, filtering to remove calcium carbonate and concentrating the filtrate to obtain the sodium salts of wood sugar acids and lignosulfonic acids substantially free of lime-precipitable lignosulfonates.

2. A dyestuff paste of improved stability and redispersibility comprising a water-dispersed solid dyestuff and a modifying additive obtained by adding an excess of lime to spent sulfite liquor, filtering to remove solids comprising calcium lignosulfonate, treating the filtrate with carbon dioxide to precipitate free lime as calcium carbonate, adding sufficient alkali metal carbonate to convert the calcium salts of the wood sugar acids and lignosulfonic acids to alkali metal salts, filtering to remove calcium carbonate and concentrating the filtrate to obtain the alkali metal salts of wood sugar acids and lignosulfonic acids substantially free of lime-precipitable lignosulfonates.

References Cited in the file of this patent

UNITED STATES PATENTS

| | | |
|---|---|---|
| 396,692 | Grun | Jan. 22, 1889 |
| 1,856,558 | Howard | May 3, 1932 |
| 2,067,926 | Kern | Jan. 19, 1937 |
| 2,090,511 | Crossley | Aug. 17, 1937 |
| 2,599,371 | Chadderton et al. | June 3, 1952 |
| 2,734,793 | Marnon | Feb. 14, 1956 |
| 2,865,906 | Nygard | Dec. 23, 1958 |
| 2,944,922 | Boggs | July 12, 1960 |

OTHER REFERENCES

Diserens: The Chemical Technology of Dyeing and Printing, 2nd Edition, published 1948, pages 51–60; pages 51 and 60 are especially pertinent.